US012583532B2

(12) United States Patent
Muramatsu et al.

(10) Patent No.: US 12,583,532 B2
(45) Date of Patent: Mar. 24, 2026

(54) SIDE SILL STRUCTURE

(71) Applicant: HONDA MOTOR CO., LTD., Tokyo (JP)

(72) Inventors: Yuki Muramatsu, Tokyo (JP); Kota Fujisawa, Tokyo (JP); Takafumi Takayama, Tokyo (JP); Kenji Inagaki, Tokyo (JP); Seiichi Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 18/191,065

(22) Filed: Mar. 28, 2023

(65) Prior Publication Data

US 2023/0312020 A1 Oct. 5, 2023

(30) Foreign Application Priority Data

Mar. 31, 2022 (JP) ................................. 2022-058232

(51) Int. Cl.
*B62D 25/04* (2006.01)
*B62D 25/02* (2006.01)
*B62D 25/20* (2006.01)

(52) U.S. Cl.
CPC ....... *B62D 25/2036* (2013.01); *B62D 25/025* (2013.01); *B62D 25/04* (2013.01)

(58) Field of Classification Search
CPC .. B62D 25/025; B62D 25/20; B62D 25/2036; B62D 25/2009; B62D 25/04
USPC ..... 296/209, 29, 30, 203.01, 203.03, 193.06
See application file for complete search history.

(56) References Cited

U.S. PATENT DOCUMENTS

| | | | | |
|---|---|---|---|---|
| 9,764,775 B2* | 9/2017 | Daigaku | ............ | B62D 25/2036 |
| 10,974,766 B2* | 4/2021 | Sakata | ............... | B62D 25/2036 |
| 2011/0175399 A1* | 7/2011 | Nakano | ................ | B62D 25/025 |
| | | | | 296/193.05 |
| 2016/0194034 A1 | 7/2016 | Emura | | |
| 2017/0113730 A1 | 4/2017 | Sakurada | | |

FOREIGN PATENT DOCUMENTS

| | | |
|---|---|---|
| CN | 105531180 A | 4/2016 |
| CN | 106608282 A | 5/2017 |
| CN | 113212562 A | 8/2021 |
| JP | 2012-111247 A | 6/2012 |
| JP | 2017-124644 A | 7/2017 |

OTHER PUBLICATIONS

Chinese Office Action received in corresponding Chinese application No. 202310240349.1 dated Sep. 27, 2025 with English translation (13 pages).

* cited by examiner

*Primary Examiner* — Dennis H Pedder
(74) *Attorney, Agent, or Firm* — Rankin, Hill & Clark LLP

(57) ABSTRACT

A side sill structure with a side sill is provided. The side sill extends in a vehicle front-rear direction on an outer side in a vehicle width direction of a floor panel, and defines a closed cross-section by a combination of a sill inner member disposed on a vehicle inner side and a sill outer member disposed on a vehicle outer side. The side sill includes a plurality of partitioning members located in the closed cross-section, and a stiffener connecting the partitioning members to one another in a longitudinal direction of the side sill. In the side sill structure, the stiffener is arranged along a corner portion formed by an inner side wall and an upper wall on the vehicle inner side of the sill inner member.

15 Claims, 9 Drawing Sheets

FIG. 5

UPPER
FRONT ⟷ REAR
LOWER

SIDE SILL STRUCTURE

CROSS-REFERENCE TO RELATED APPLICATION

This application claims the benefit of foreign priority to Japanese Patent Application No. 2022-058232, filed on Mar. 31, 2022, which is incorporated by reference in its entirety.

TECHNICAL FIELD

The present invention relates to a side sill structure which is capable of suppressing a deformation of a side sill in such a way as to fall against a floor panel by input of a side collision load to a vehicle.

BACKGROUND

As described in JP2012-111247A, there has heretofore been a structure configured to secure torsional rigidity of a vehicle body while suppressing an increase in weight thereof by providing bulkheads in the vicinity of vehicle front and rear parts relative to a center pillar joint portion of each of side sills provided on two sides of a vehicle and providing a reinforcement member in the vicinity of a front pillar joint portion. In this structure, reinforcement members are disposed on an outer side below each side sill so as to extend across the bulkheads.

However, a moment is applied to the side sill when a side collision load is inputted to the side sill of the structure described in JP2012-111247A. Accordingly, this structure has a problem of a decrease in absorption efficiency of the side collision load. The decrease in absorption efficiency of the side collision load may lead to a falling deformation of the side sill.

The present invention has been made in view of the above-described circumstance. An object of the present invention is to provide a side sill structure which is capable of improving absorption efficiency of a side collision load while suppressing a moment to be applied to a side sill when the side collision load is inputted to a vehicle.

SUMMARY

To achieve the above object, one aspect of the present invention is to provide a side sill structure comprising: a side sill extending in a vehicle front-rear direction on an outer side in a vehicle width direction of a floor panel, and defining a closed cross-section by a combination of a sill inner member disposed on a vehicle inner side and a sill outer member disposed on a vehicle outer side, the side sill including a plurality of partitioning members located in the closed cross-section, and a stiffener connecting the partitioning members to one another in a longitudinal direction of the side sill, wherein the stiffener is arranged along a corner portion formed by an inner side wall and an upper wall on the vehicle inner side of the sill inner member.

BRIEF DESCRIPTION OF THE DRAWINGS

The drawings described herein are for illustration purposes only and are not intended to limit the scope of the present invention in any way.

FIG. 5 is a side view showing a pillar and the like joined to the side sill.

DETAILED DESCRIPTION

<Configuration of Side Sill Structure>

Figure 1:
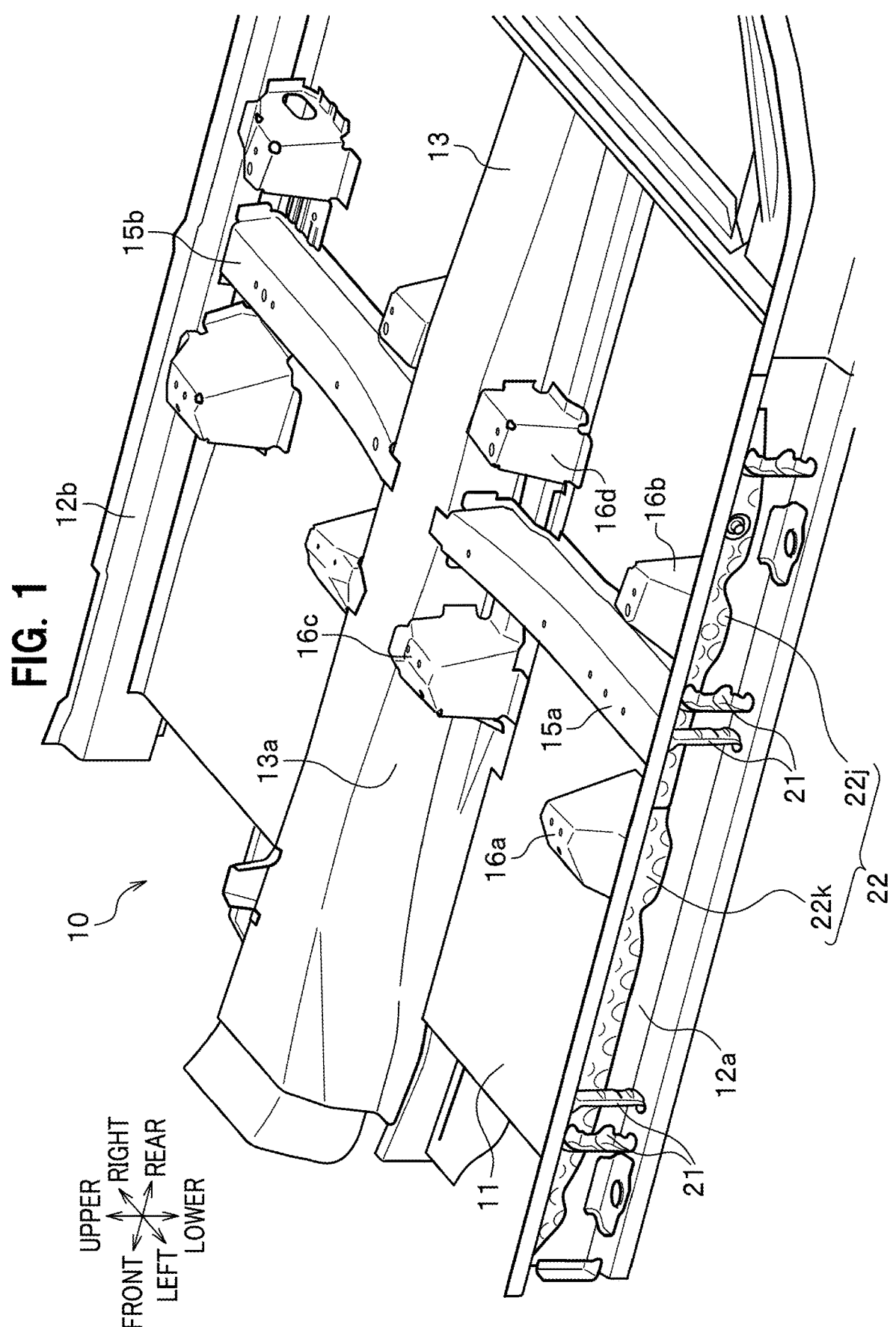
FIG. 1 is a perspective view showing a side sill structure on two sides of a floor panel in a vehicle according to one embodiment of the present invention.

One embodiment of the present invention will be described in detail with reference to FIG. 1 to FIG. 9. In the description, the same elements are denoted by the same reference numerals and redundant explanation thereof will be omitted. In the drawings, front and rear directions shown by arrows refer to corresponding front and rear directions in the longitudinal direction (i.e., front-rear direction) of an automobile (not shown), right and left directions shown by arrows refer to corresponding right and left directions in the vehicle width direction (i.e., lateral direction or right-left direction) of the automobile, and upper and lower directions refer to corresponding upper and lower directions in the vertical direction (i.e., upper-lower direction of the automobile).

FIG. 1 is a perspective view showing a side sill structure on two sides of a floor panel in a vehicle.

A side sill structure 10 shown in FIG. 1 is a structure involving side sills 12a and 12b provided in such a way as to be joined to outer edge portions in a vehicle width direction of a floor panel 11 of a vehicle and to extend in a vehicle front-rear direction (also referred to as a front-rear direction). The floor panel 11 is provided with a floor tunnel 13 that extends in the middle in the vehicle width direction and parallel to the side sills 12a and 12b on the two sides, floor cross members (also referred to as cross members) 15a and 15b, and a plurality of seat brackets 16a, 16b, 16c, and 16d.

Note that the respective seat brackets 16a to 16d are disposed at bilaterally symmetrical positions in the vehicle width direction relative to the floor tunnel 13, and only those on the left side in the vehicle width direction are denoted by reference numerals. Members on the left side in the vehicle width direction, namely, the seat brackets 16a to 16d, the cross member 15a, the side sill 12a, and the like will be described below as typical examples. As for the seat brackets 16a to 16d, the seat bracket 16a on the side sill 12a side (see FIG. 3) will be described as a typical example unless explanations of the seat brackets 16a to 16d are required.

The floor tunnel 13 extends in the front-rear direction in the middle of a space between the side sills 12a and 12b located on the two sides of the vehicle. In addition, the floor tunnel 13 is joined to an inner edge portion in the vehicle width direction of the floor panel 11 such that the tunnel is open to a lower outdoor side (an outdoor side) of the vehicle.

Figure 5:
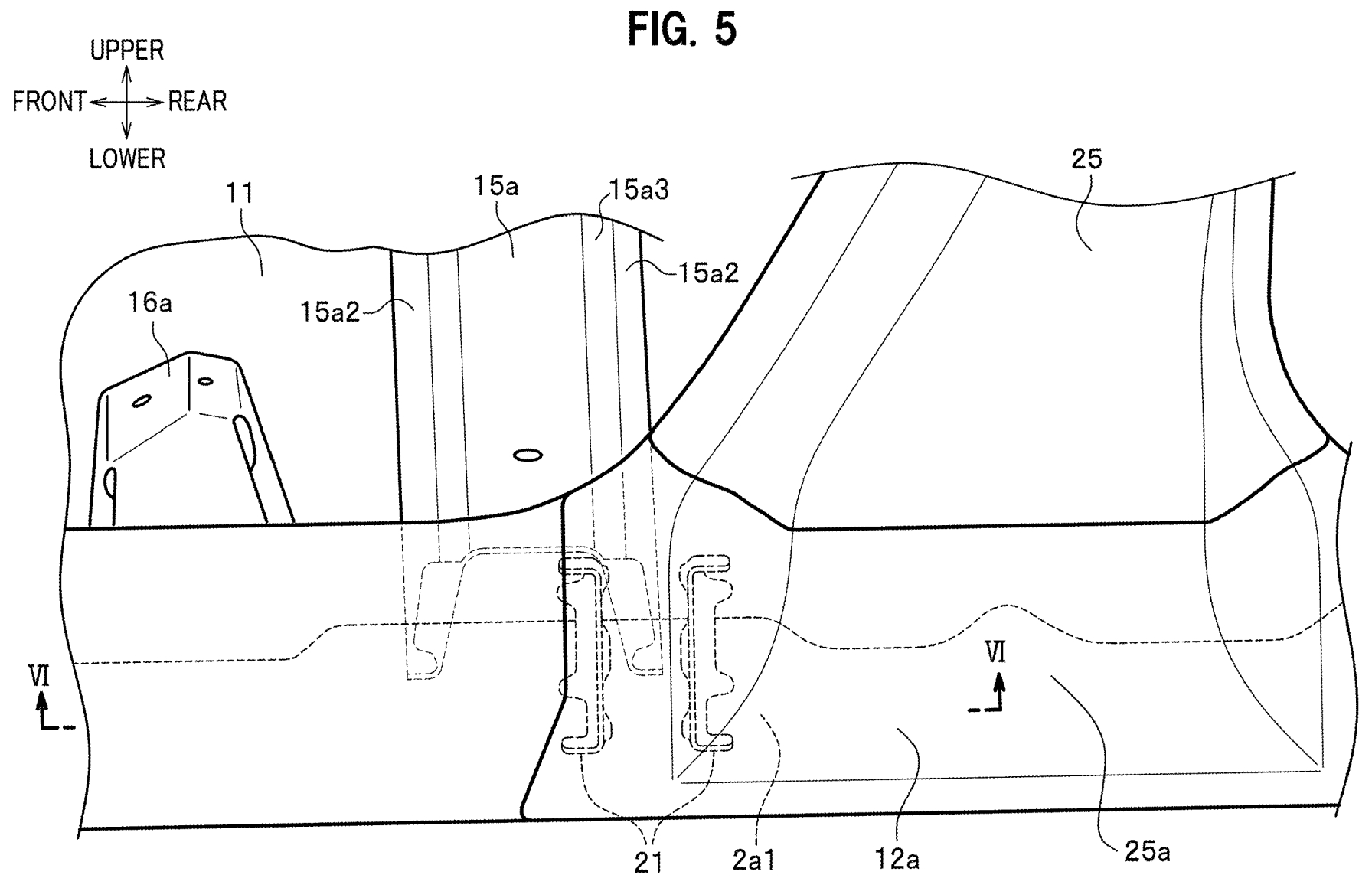

The cross members 15a and 15b extend in the vehicle width direction. Each of the cross members 15a and 15b connects the floor tunnel 13 to the corresponding one of the side sills 12a and 12b that extend in the front-rear direction. The cross member 15a defines a hollow cross-section (a closed cross-section) by using the floor panel 11 as a bottom surface, and flanges 15a2 that extend forward and rearward in the vehicle width direction from a lower end of the cross member 15a are joined to the floor panel 11 as shown in FIG. 5.

Figure 4:
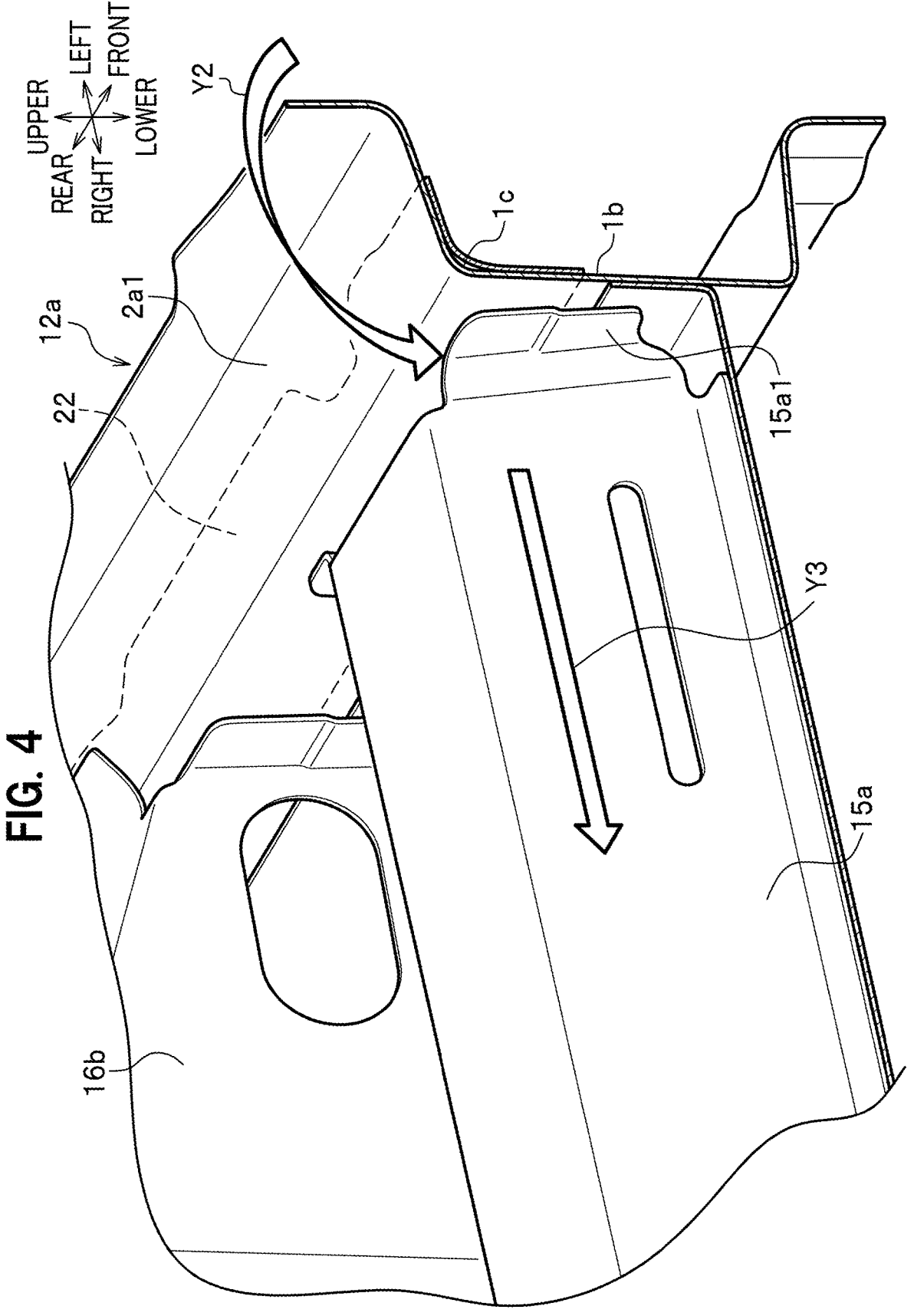
FIG. 4 is a perspective view showing a configuration of the cross member that is joined to a stiffener with the side sill being interposed therebetween.
Figure 6:
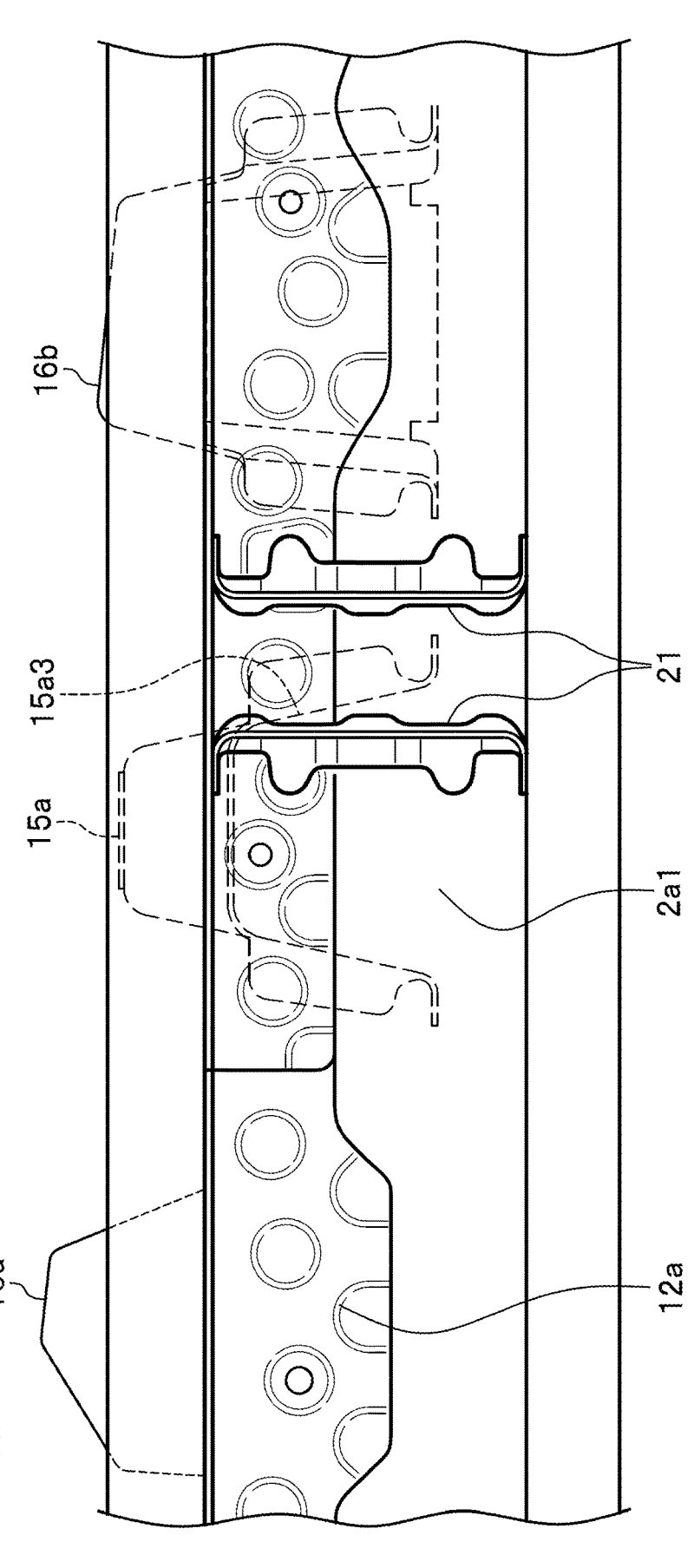
FIG. 6 is a cross-sectional view taken along the VI-VI line in FIG. 5.

As shown in FIG. 4, vertical flanges 15a1 bent and provided on front and rear sides at an end portion on a vehicle outer side of the closed cross-section of the cross member 15a are connected to an inner side wall 1b of a sill inner member 2a1 on a vehicle inner side of the side sill 12a. Meanwhile, a flange in the vertical direction at an end portion of the closed cross-section on the vehicle inner side of the cross member 15a shown in FIG. 1 is joined to a side surface 13a of the floor tunnel 13 directed outward in the vehicle width direction.

Figure 2:
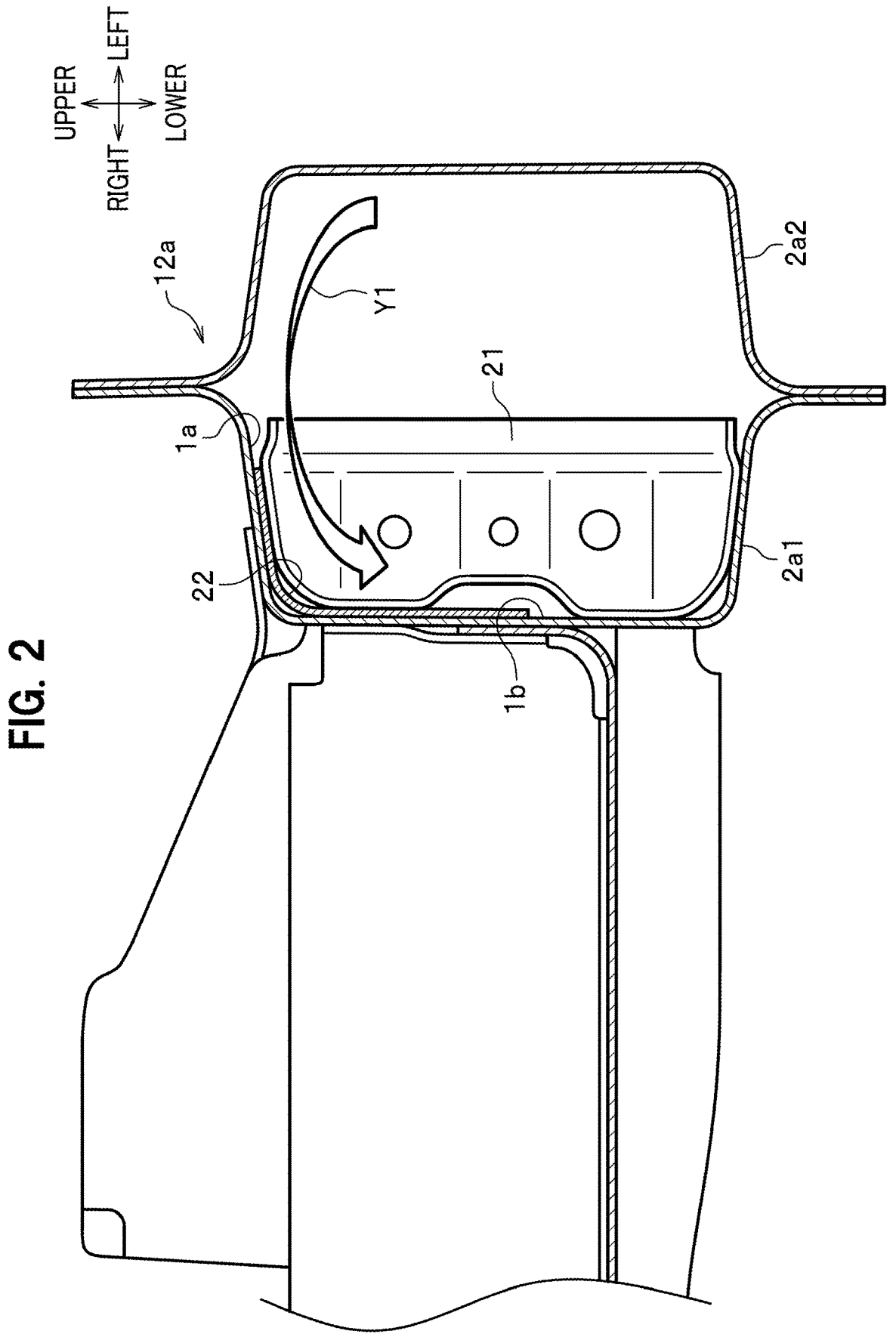
FIG. 2 is a cross-sectional view of a side sill portion at a left side of the vehicle.

As shown in FIG. 2, the side sill 12a includes the sill inner member 2a1 located on the vehicle inner side and a sill outer member (a sill stiffener) 2a2 located on the vehicle outer side.

The sill inner member 2a1 forms a hat-like cross-sectional shape that protrudes to the vehicle inner side, while the sill outer member 2a2 forms a hat-like cross-sectional shape that protrudes to a vehicle outer side. Flanges of both of the sill inner member 2a1 and the sill outer member 2a2 extending in an upper direction and a lower direction are joined to one another, thus defining a hollow cross-section (a closed cross-section) that is formed from a combination of hollows defined inside the respective protrusions.

A corner portion 1c formed by joining substantially at right angles an upper wall 1a, which extends in a lateral direction on the vehicle inner side, and the inner side wall 1b that extends in a vertical direction (a vehicle upper-lower direction) on the vehicle inner side is provided in the closed cross-section of the sill inner member 2a1. A stiffener (a reinforcement member) 22 extends along the corner portion 1c and is joined across the corner portion 1c.

Partitioning members (bulkheads) 21 are joined to the inside of the closed cross-section of the sill inner member 2a1. Each partitioning member 21 is formed into a vertically long shape that closes only the closed cross-section of the sill inner member 2a1. The partitioning members 21 are provided at predetermined positions of the side sill 12a that extends in a longitudinal direction as shown in FIG. 1. In this embodiment, pairs of the partitioning members 21 are provided at several locations.

As shown in FIG. 2, the partitioning members 21 are provided only to the sill inner member 2a1 and the sill outer member 2a2 therefore remains hollow. This hollow serves for absorption of energy originating from a side collision load by allowing the sill outer member 2a2 to crush in the event of a vehicle side collision.

Figure 3:
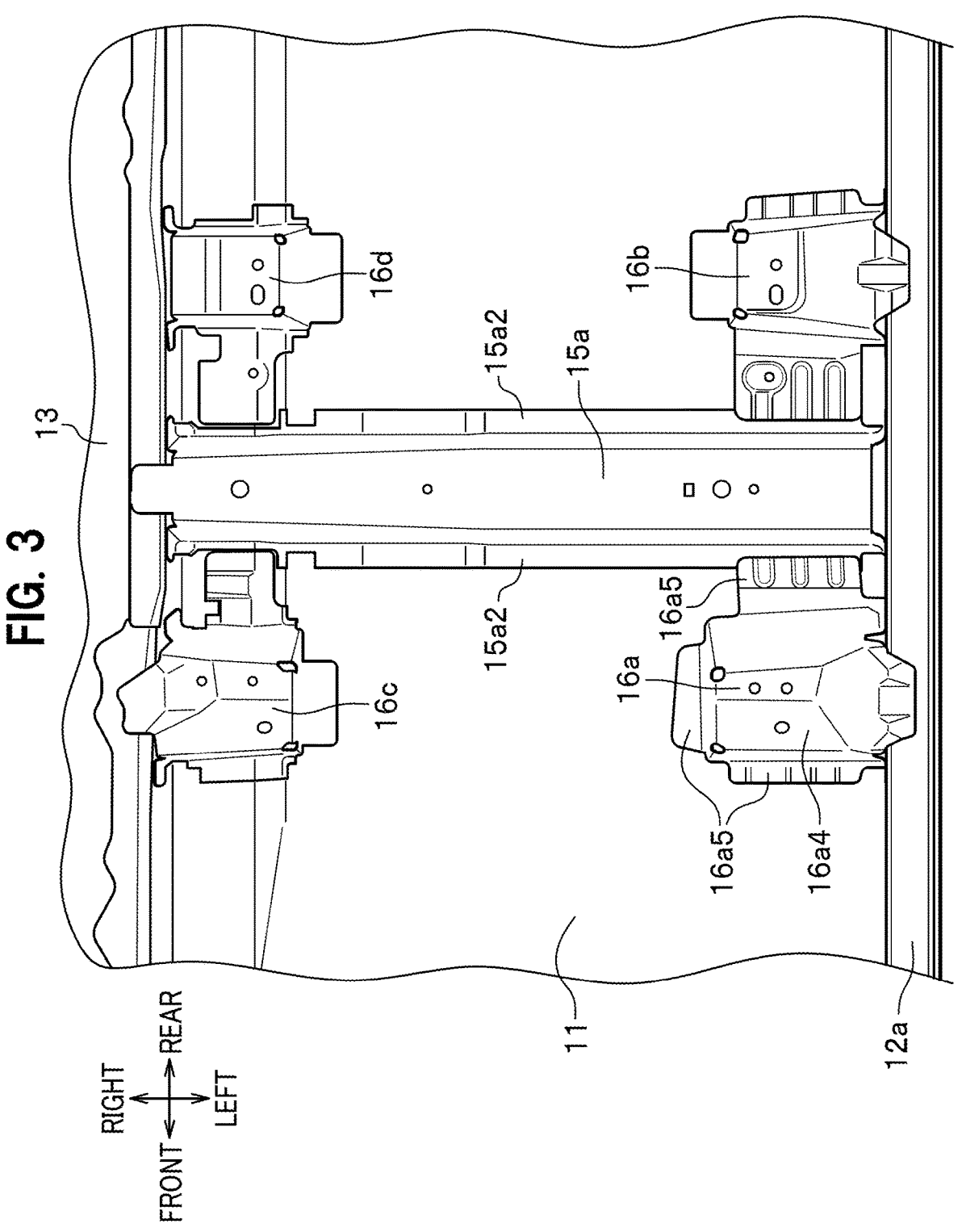
FIG. 3 is a perspective view showing structures of the side sill, seat brackets, a cross member, and a floor tunnel provided on the floor panel.

As shown in FIG. 3, the seat brackets 16a to 16d are designed to mount and support a seat (not shown) on which a passenger is seated, and are deployed on a front side and a rear side in the vehicle front-rear direction of the cross member 15a. The seat brackets 16a to 16d are connected to the side sill 12a, the floor tunnel 13, and the cross member 15a as described below.

Figure 7:
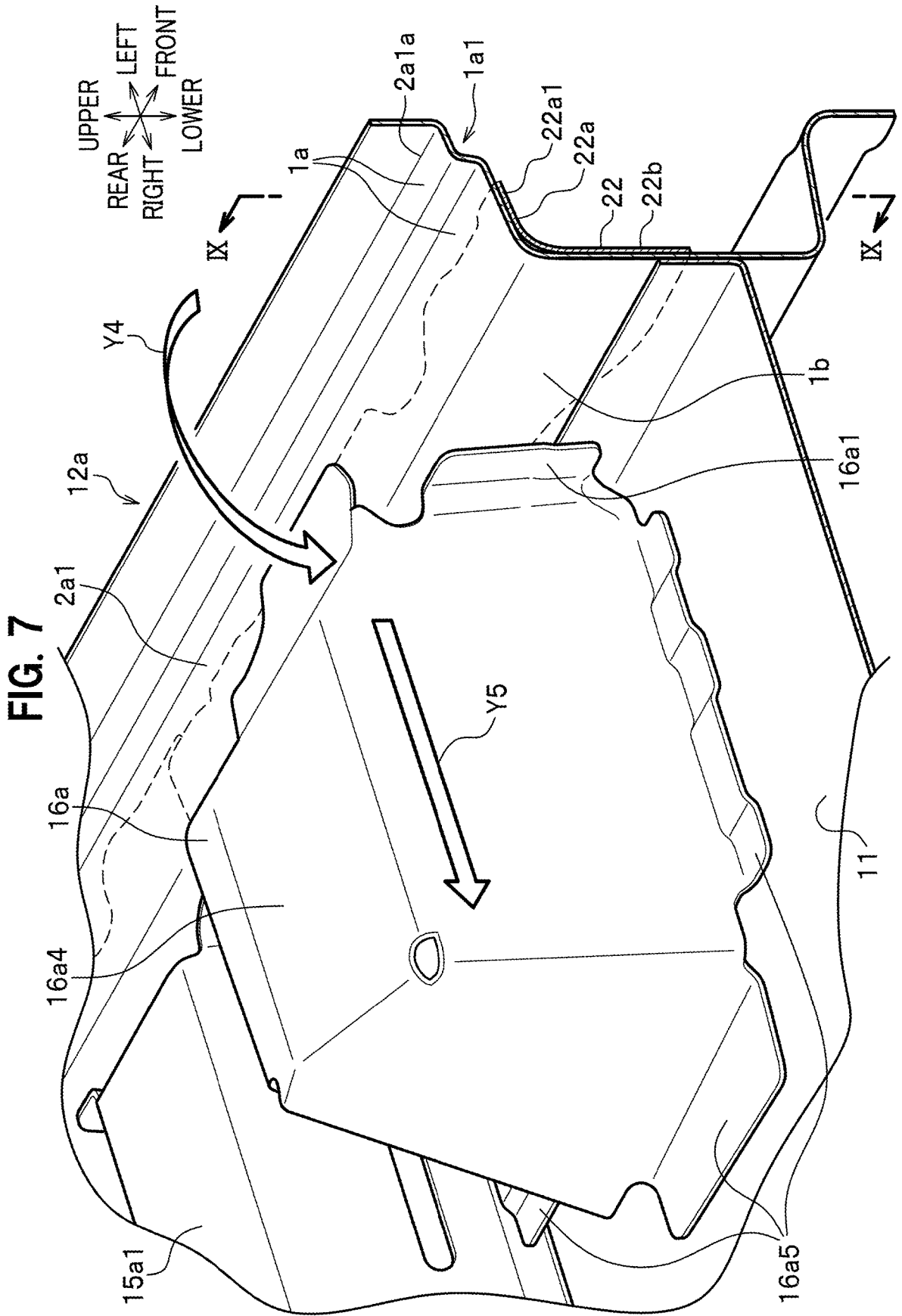
FIG. 7 is a perspective view showing a configuration of the seat bracket joined to the stiffener with a sill inner member of the side sill being interposed therebetween.

The seat bracket 16a on the side sill 12a side will be described as a typical example. The seat bracket 16a includes a body portion 16a4 that defines a hollow cross-section by using the floor panel 11 as a bottom surface. The seat bracket 16a also includes flanges 16a5, which extend in three directions of a front direction, a rear direction, and a vehicle width vehicle inner direction from a lower end of the body portion 16a4. Each flange 16a5 is joined to the floor panel 11. The flange 16a5 on the rear side of the body portion 16a4 is joined to the flange 15a2 of the cross member 15a. Meanwhile, vertical flanges 16a1 that are bent forward and rearward of the vehicle from an end portion of the closed cross-section of the body portion 16a4 shown in FIG. 7 are joined to the vehicle inner side of the inner side wall 1b of the sill inner member 2a1. Likewise, the seat brackets 16c and 16d on the floor tunnel 13 side shown in FIG. 3 are also joined to the floor panel 11, the cross member 15a, and the floor tunnel 13.

As shown in FIG. 4, the stiffener 22 that is joined across the corner portion 1c on the vehicle outer side of the sill inner member 2a1 in the side sill 12a is joined to the flange 15a1 of the cross member 15a with the inner side wall 1b of the sill inner member 2a1 being interposed therebetween.

As shown in FIG. 5, a center pillar (hereinafter referred to as a pillar) 25 that extends upward in the vehicle is connected to the side sill 12a. A lower end portion 25a of the pillar that extends in a predetermined length in the front-rear direction is connected to the side sill 12a. The pair of partitioning members 21 are joined to a position of the sill inner member 2a1 where a front end portion of the lower end portion 25a of the pillar 25 overlaps the cross member 15a in the vehicle width direction. While there are two pairs of the partitioning members 21 in this embodiment, three or more pairs of the partitioning members 21 may be provided instead.

In other words, the partitioning members 21 and the cross member 15a joined to the sill inner member 2a1 are arranged at positions overlapping a front end portion of the lower end portion 25a of the pillar 25 that is connected to the side sill 12a when viewed from side of the vehicle (when viewed from side). This structure increases strength of the pillar 25 and the side sill 12a for withstanding the side collision load.

The flanges 15a2 of the cross member 15a are joined to the floor panel 11 and to flanges (as typified by the flanges 16a5 of the seat bracket 16a shown in FIG. 3, for example) of the respective seat brackets 16a to 16d. Moreover, these flanges 16a5 are provided with beads. This structure achieves high joint strength of the cross member 15a. Accordingly, the cross member 15a can transmit the side collision load inputted to the pillar 25 more efficiently to the cross member 15a through the partitioning member 21 and the stiffener 22 of the sill inner member 2a1.

As described above, at least two partitioning members 21 each overlapping the front end portion of the lower end portion 25a of the pillar 25 are provided to the sill inner member 2a1 at positions spaced apart from each other in the vehicle front-rear direction. The cross member 15a is joined to the floor panel 11 and to the sill inner member 2a1 such that a rear wall 15a3 of the cross member 15a is disposed in a space in the vehicle front-rear direction between these two partitioning members 21. By disposing the rear wall 15a3 of the cross member 15a between the two partitioning members 21 as described above, the side collision load inputted to the pillar 25 can be transmitted to the cross member 15a through the partitioning members 21.

As shown in FIG. 3, the flange 16a5 at the rear side of the seat bracket 16a that is joined to the floor panel 11 is also connected to the flange 15a2 of the cross member 15a. As shown in FIG. 7, the vertical flanges 16a1 at the front side and the rear side of the seat bracket 16a are joined to the stiffener 22 through the inner side wall 1b of the sill inner member 2a1. In other words, since the stiffener 22 is joined to the seat bracket 16a with the sill inner member 2a1 being interposed therebetween, the side collision load inputted to the side sill 12a is transmitted to the seat bracket 16a and to the cross member 15a through the stiffener 22.

Figure 8:
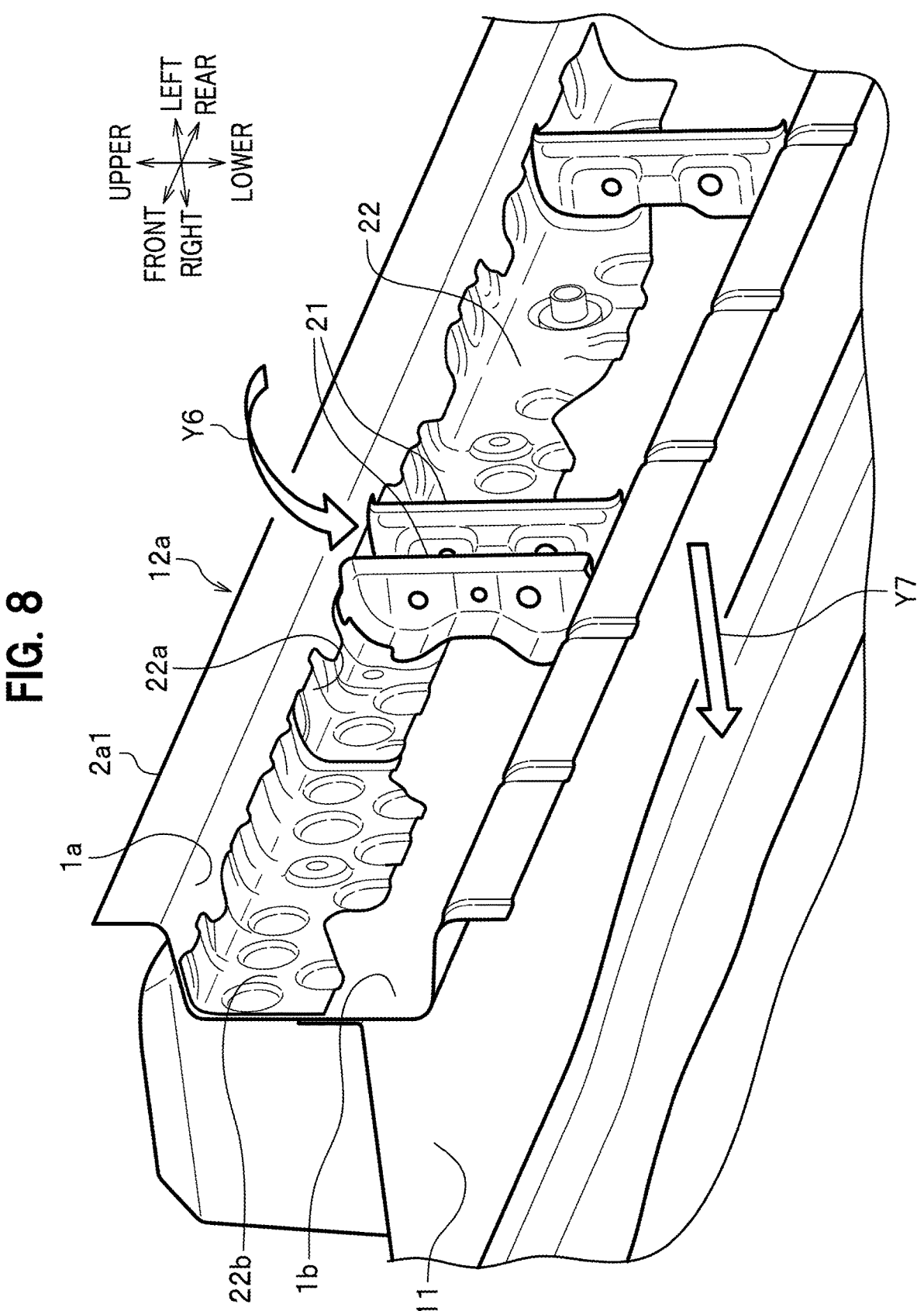
FIG. 8 is a perspective view showing configurations of partitioning members joined to the sill inner member with the stiffener being interposed therebetween.

As shown in FIG. 8, the stiffener 22 is formed into an L-shaped cross-section. The L-shaped cross-section is formed by butting and connecting a lower portion 22b that extends along the inner side wall 1b of the sill inner member 2a1 substantially at a right angle to an upper portion 22a that extends along the upper wall 1a thereof. The partitioning members 21 are joined to the lower portion 22b and the upper portion 22a of the stiffener 22. The structure of the side sill 12a is strengthened by joining the plurality of partitioning members 21 to the lower portion 22b and the upper portion 22a of the L-shaped stiffener 22 as described above. Hence, the side collision load (see an arrow Y6) inputted to the strengthened side sill 12a and to the pillar 25 is transmitted to the floor panel 11 (see an arrow Y7) through the stiffener 22 and the partitioning members 21 serving as reinforcement members.

As shown in FIG. 1, the stiffener 22 to be joined to the corner portion 1c (FIG. 2) of the sill inner member 2a1 includes a first stiffener 22j joined to a position overlapping the cross member 15a and a second stiffener 22k joined to a position frontward of the cross member 15a when viewed from side of the vehicle. The first stiffener 22j and the second stiffener 22k are connected to each other between the cross member 15a and the seat bracket 16a located frontward of the cross member 15a.

Since both the cross member 15a and the seat bracket 16a that is located frontward of the cross member 15a are joined to the inner side wall 1b of the sill inner member 2a1, a section of the sill inner member 2a1 between these members is strengthened. For this reason, rigidity of the side sill 12a is increased because the first stiffener 22j is connected to the second stiffener 22k at the section of the sill inner member 2a1 between these members and the section between these members is therefore strengthened. As a consequence, the side collision load inputted to the side sill 12a is efficiently transmitted to the entire side sill 12a as well as to the cross member 15a and the seat bracket 16a through the stiffener 22.

Figure 9:
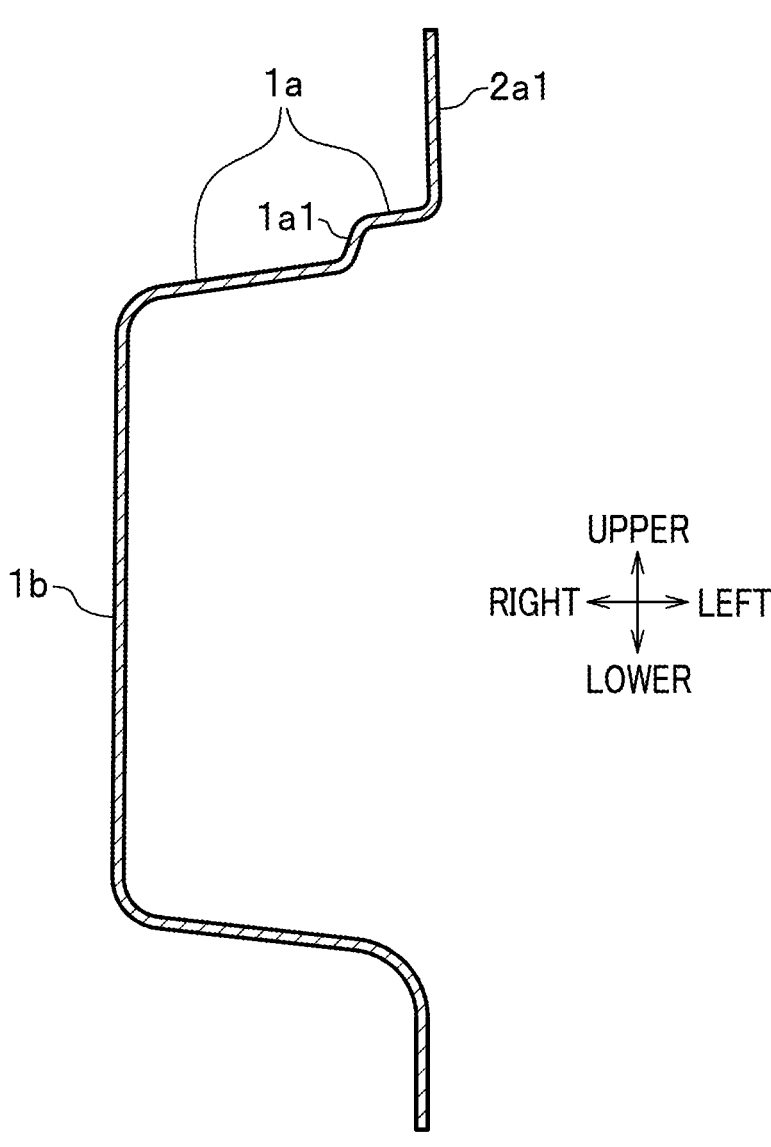
FIG. 9 is a cross-sectional view of the sill inner member shown in FIG. 7 taken along the IX-IX line.

As shown in FIG. 9 which is a cross-sectional view taken along the IX-IX line in FIG. 7, the upper wall 1a of the sill inner member 2a1 includes a stepped portion 1a1 in which a step formed in the vehicle width direction extends in the longitudinal direction of the sill inner member 2a1. As shown in FIG. 7, the stepped portion 1a1 is formed between an outer end 22a1 of the upper portion 22a of the stiffener 22 and a lower end 2a1a of a flange of the sill inner member 2a1 provided upright in the vehicle. By providing the stepped portion 1a1 to the upper wall 1a of the sill inner member 2a1 as described above, it is possible to improve the rigidity of the side sill 12a.

<Advantageous Effects of Side Sill Structure 10>

Next, characteristic configurations and advantageous effects of the side sill structure according to the above-described embodiment will be explained.

(1) The side sill structure 10 includes the side sill 12a, which extends in the vehicle front-rear direction on the outer side in the vehicle width direction of the floor panel 11, and defines the closed cross-section by a combination of the sill inner member 2a1 disposed on the vehicle inner side and the sill outer member 2a2 disposed on the vehicle outer side. The side sill 12a includes a plurality of partitioning members 21 located in the closed cross-section, and the stiffener 22 that connects the partitioning members 21 to one another in the longitudinal direction of the side sill 12a. The stiffener 22 is arranged along the corner portion 1c that is formed by the inner side wall 1b and the upper wall 1a on the vehicle inner side of the sill inner member 2a1.

According to this configuration, the corner portion 1c at the upper portion on the vehicle inner side in the closed cross-section of the side sill 12a is reinforced by providing the stiffener 22 disposed at the corner portion 1c at the upper portion on the vehicle inner side of the side sill 12a. Thus, the side collision load inputted to the side sill 12a can be efficiently transmitted to the floor panel 11 through the reinforced stiffener 22. Since the transmission to the floor panel 11 suppresses a moment (see an arrow Y1 in FIG. 2) to be inputted to the side sill 12a in the event of the side collision, it is possible to suppress such a deformation that the side sill 12a falls against the floor panel 11.

In other words, in the event of the input of the side collision load to the vehicle, it is possible to suppress the moment to be applied to the side sill 12a and thus to improve absorption efficiency of the side collision load. As a consequence, it is possible to efficiently secure a load transmission route in the event of the side collision and to improve reliability of mode control for the efficient securement.

(2) The seat brackets 16a to 16d to support the seat (not shown) and the cross member 15a disposed at the position interposed in the vehicle front-rear direction between the seat brackets 16a to 16d are joined to the floor panel 11. The stiffener 22 is joined to the cross member 15a with the inner side wall 1b of the sill inner member 2a1 being interposed therebetween.

According to this configuration, by joining the stiffener 22 to the cross member 15a through the inner side wall 1b of the sill inner member 2a1, it is possible to transmit the side collision load, which is inputted to the side sill 12a as indicated with an arrow Y2 in FIG. 4, to the cross member 15a through the stiffener 22 as indicated with an arrow Y3. Since the moment (see the arrow Y2 in FIG. 4) to be inputted to the side sill 12a in the event of the side collision is suppressed by the transmission to the cross member 15a, it is possible to suppress the deformation of the side sill 12a in such a way as to fall against the floor panel 11. Thus, the reliability of the mode control can be improved as with the above-described configuration.

(3) The pillar 25 that extends upward in the vehicle is connected to the side sill 12a. The partitioning members 21 of the side sill 12a and the cross member 15a are arranged at the positions overlapping the pillar 25 when viewed from side of the vehicle.

According to this configuration, when viewed from side, the partitioning members 21 joined to the side sill 12a and the cross member 15a are arranged at the positions overlapping the lower end portion 25a of the pillar 25 that is connected to the side sill 12a. As a consequence, the side collision load inputted to the pillar 25 can be transmitted to the cross member 15a through the side sill 12a that is strongly reinforced with the partitioning members 21. This load transmission from the pillar 25 to the cross member 15a suppresses the moment (see the arrow Y2 in FIG. 4) to be inputted to the pillar 25 and to the side sill 12a in the event of the side collision. Thus, it is possible to suppress such a deformation that the pillar 25 or the side sill 12a falls against the floor panel 11. Accordingly, it is possible to improve the reliability of the mode control as with the above-described configurations.

(4) At least two partitioning members 21 that overlap the pillar 25 are provided spaced apart from each other in the vehicle front-rear direction. The rear wall of the cross member 15*a* is disposed between the two partitioning members 21.

According to this configuration, the rear wall 15*a*3 of the cross member 15*a* is disposed between the two partitioning members 21 of the side sill 12*a*. Thus, the side collision load inputted to the pillar 25 can be transmitted to the cross member 15*a* through the portion of the side sill 12*a* that is strongly reinforced by the two partitioning members 21. This load transmission from the pillar 25 to the cross member 15*a* suppresses the moment (see the arrow Y2 in FIG. 4) to be inputted to the pillar 25 and to the side sill 12*a* in the event of the side collision. Thus, it is possible to suppress such a deformation that the pillar 25 or the side sill 12*a* falls against the floor panel 11. Accordingly, it is possible to improve the reliability of the mode control as with the above-described configurations.

(5) The seat bracket 16*a* is connected to the cross member 15*a* and is joined to the stiffener 22 with the sill inner member 2*a*1 being interposed therebetween.

According to this configuration, the seat bracket 16*a* is connected to the cross member 15*a* and is joined to the stiffener 22 with the sill inner member 2*a*1 being interposed therebetween. Thus, the side sill 12*a* is strongly supported from the vehicle inner side by both the cross member 15*a* and the seat bracket 16*a*. As a consequence, the side collision load inputted to the side sill 12*a* as indicated with an arrow Y4 in FIG. 7 can be transmitted to both the seat bracket 16*a* and the cross member 15*a* as indicated with an arrow Y5 without causing the side sill 12*a* to fall on the vehicle inner side. This load transmission to these two members suppresses the moment (see the arrow Y4 in FIG. 7) to be inputted to the side sill 12*a* in the event of the side collision. Thus, it is possible to suppress such a deformation that the side sill 12*a* falls against the floor panel 11. Accordingly, it is possible to improve the reliability of the mode control as with the above-described configurations.

(6) The stiffener 22 is formed by connecting the lower portion 22*b* that extends along the inner side wall 1*b* of the sill inner member 2*a*1 and the upper portion 22*a* that extends along the upper wall 1*a* of the sill inner member 2*a*1 into the L-shaped cross-section. The plurality of partitioning members 21 are joined to the lower portion 22*b* and the upper portion 22*a* of the stiffener 22.

According to this configuration, the partitioning members 21 are joined to the lower portion 22*b* and the upper portion 22*a* of the L-shaped stiffener 22, whereby the structure of the side sill 12*a* is strengthened. The side collision load inputted to the strong side sill 12*a* and to the pillar 25 as indicated with an arrow Y6 in FIG. 8 can be transmitted to the floor panel 11 through the stiffener 22 and the partitioning members 21 serving as the reinforcement members as indicated with the arrow Y7. This load transmission to the floor panel 11 suppresses the moment (see the arrow Y6 in FIG. 8) to be inputted to the side sill 12*a* in the event of the side collision. Thus, it is possible to suppress such a deformation that the side sill 12*a* falls against the floor panel 11. Accordingly, it is possible to improve the reliability of the mode control as with the above-described configurations.

(7) The stiffener 22 includes the first stiffener 22*j* joined to a position overlapping the cross member 15*a* and the second stiffener 22*k* joined to a position frontward of the cross member 15*a* when viewed from side of the vehicle. The first stiffener 22*j* and the second stiffener 22*k* are connected to each other between the cross member 15*a* and the seat bracket 16*a* located frontward of the cross member 15*a*.

According to this configuration, the rigidity of the side sill 12*a* can be improved by connecting the first stiffener 22*j* and the second stiffener 22*k* between the cross member 15*a* and the seat bracket 16*a* located on the vehicle front side. Accordingly, the side collision load inputted to the side sill 12*a* can be efficiently transmitted to the entire side sill 12*a* as well as to the seat bracket 16*a* and the cross member 15*a* through the stiffener 22. In addition, since the first stiffener 22*j* and the second stiffener 22*k* are formed along the longitudinal direction of the side sill 12*a*, the entire side sill 12*a* is reinforced so that the side sill 12*a* can withstand a load in the event of an offset collision or the like.

(8) The upper wall 1*a* of the sill inner member 2*a*1 includes the stepped portion 1*a*1 in which the step provided in the vehicle width direction extends in the longitudinal direction of the sill inner member 2*a*1 at the upper wall 1*a*. The stepped portion 1*a*1 is formed between the outer end 22*a*1 of the upper portion 22*a* of the stiffener 22 and the lower end 2*a*1*a* of the flange of the sill inner member 2*a*1 provided upright in the vehicle.

According to this configuration, provision of the stepped portion 1*a*1 to the upper wall 1*a* of the sill inner member 2*a*1 makes it possible to improve the rigidity of the side sill 12*a*. As a consequence, the load in the event of the offset collision or the like can be efficiently transmitted to a rear portion of the side sill 12*a*. Meanwhile, the rigidity of the side sill 12*a* can be secured with the simple structure of only forming the stepped portion 1*a*1. Hence, the sill inner member 2*a*1 is applicable even when the width of the side sill 12*a* varies depending on the type of the vehicle.

The vehicle body structure according to one embodiment of the present invention has been described above. It is to be noted, however, that the present invention is not limited thereto and various changes and modifications may be made where appropriate without departing from the gist of the present invention.

What is claimed is:

1. A side sill structure comprising:

a side sill extending in a vehicle front-rear direction on an outer side in a vehicle width direction of a floor panel, and defining a closed cross-section by a combination of a sill inner member disposed on a vehicle inner side and a sill outer member disposed on a vehicle outer side, the side sill including a plurality of partitioning members located in the closed cross-section, and a stiffener connecting the partitioning members to one another in a longitudinal direction of the side sill, wherein the stiffener is arranged along a corner portion formed by an inner side wall and an upper wall on the vehicle inner side of the sill inner member, and the plurality of partitioning members are provided only in the sill inner member.

2. The side sill structure according to claim 1, wherein a plurality of seat brackets configured to support a seat and a floor cross member disposed at a position interposed in the vehicle front-rear direction between the seat brackets are joined to the floor panel, and the stiffener is joined to the floor cross member with the inner side wall of the sill inner member being interposed therebetween.

3. The side sill structure according to claim 2, wherein a pillar extending upward in a vehicle is connected to the side sill, and the partitioning members of the side sill and the floor cross member are arranged at positions overlapping the pillar when viewed from side of the vehicle.

4. The side sill structure according to claim 3, wherein at least two partitioning members overlapping the pillar are provided spaced apart from each other in the vehicle front-rear direction, and a rear wall of the floor cross member is disposed between the two partitioning members.

5. The side sill structure according to claim 2, wherein the seat bracket is connected to the floor cross member and is joined to the stiffener with the sill inner member being interposed therebetween.

6. The side sill structure according to claim 3, wherein the stiffener is formed by connecting a lower portion extending along the inner side wall of the sill inner member and an upper portion extending along an upper wall of the sill inner member into an L-shaped cross-section, and the plurality of partitioning members are joined to the lower portion and the upper portion of the stiffener.

7. The side sill structure according to claim 6, wherein the stiffener includes a first stiffener joined to a position overlapping the floor cross member and a second stiffener joined to a position frontward of the floor cross member when viewed from side of the vehicle, and the first stiffener and the second stiffener are connected to each other between the floor cross member and a seat bracket located frontward of the floor cross member.

8. The side sill structure according to claim 6, wherein the upper wall of the sill inner member includes a stepped portion in which a step provided in the vehicle width direction extends in a longitudinal direction of the sill inner member at the upper wall, and the stepped portion is formed between an outer end of the upper portion of the stiffener and a lower end of a flange of the sill inner member provided upright in the vehicle.

9. A side sill structure comprising:

a side sill extending in a vehicle front-rear direction on an outer side in a vehicle width direction of a floor panel, and defining a closed cross-section by a combination of a sill inner member disposed on a vehicle inner side and a sill outer member disposed on a vehicle outer side, the side sill including a plurality of partitioning members located in the closed cross-section, and a stiffener connecting the partitioning members to one another in a longitudinal direction of the side sill, wherein the stiffener is arranged along a corner portion formed by an inner side wall and an upper wall on the vehicle inner side of the sill inner member, a plurality of seat brackets configured to support a seat and a floor cross member disposed at a position interposed in the vehicle front-rear direction between the seat brackets are joined to the floor panel, the stiffener is joined to the floor cross member with the inner side wall of the sill inner member being interposed therebetween, a pillar extending upward in a vehicle is connected to the side sill, and the partitioning members of the side sill and the floor cross member are arranged at positions overlapping the pillar when viewed from side of the vehicle.

10. The side sill structure according to claim 9, wherein at least two partitioning members overlapping the pillar are provided spaced apart from each other in the vehicle front-rear direction, and a rear wall of the floor cross member is disposed between the two partitioning members.

11. The side sill structure according to claim 9, wherein the seat bracket is connected to the floor cross member and is joined to the stiffener with the sill inner member being interposed therebetween.

12. The side sill structure according to claim 9, wherein the stiffener is formed by connecting a lower portion extending along the inner side wall of the sill inner member and an upper portion extending along an upper wall of the sill inner member into an L-shaped cross-section, and the plurality of partitioning members are joined to the lower portion and the upper portion of the stiffener.

13. The side sill structure according to claim 12, wherein the stiffener includes a first stiffener joined to a position overlapping the floor cross member and a second stiffener joined to a position frontward of the floor cross member when viewed from side of the vehicle, and the first stiffener and the second stiffener are connected to each other between the floor cross member and a seat bracket located frontward of the floor cross member.

14. The side sill structure according to claim 12, wherein the upper wall of the sill inner member includes a stepped portion in which a step provided in the vehicle width direction extends in a longitudinal direction of the sill inner member at the upper wall, and the stepped portion is formed between an outer end of the upper portion of the stiffener and a lower end of a flange of the sill inner member provided upright in the vehicle.

15. A side sill structure comprising:

a side sill extending in a vehicle front-rear direction on an outer side in a vehicle width direction of a floor panel, and defining a closed cross-section by a combination of a sill inner member disposed on a vehicle inner side and a sill outer member disposed on a vehicle outer side, the side sill including a plurality of partitioning members located in the closed cross-section, and a stiffener connecting the partitioning members to one another in a longitudinal direction of the side sill, wherein the stiffener is arranged along a corner portion formed by an inner side wall and an upper wall on the vehicle inner side of the sill inner member, the upper wall of the sill inner member includes a stepped portion in which a step provided in the vehicle width direction extends in a longitudinal direction of the sill inner member at the upper wall, and the stepped portion is formed between an outer end of the upper portion of the stiffener and a lower end of a flange of the sill inner member provided upright in the vehicle.

* * * * *